United States Patent
Zhou et al.

(10) Patent No.: US 11,928,037 B2
(45) Date of Patent: Mar. 12, 2024

(54) DATABASE RESTORATION ACROSS CLOUD ENVIRONMENTS

(71) Applicant: Rubrik, Inc., Palo Alto, CA (US)

(72) Inventors: Pin Zhou, San Jose, CA (US); Prasenjit Sarkar, Los Gatos, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 17/734,852

(22) Filed: May 2, 2022

(65) Prior Publication Data

US 2022/0308967 A1 Sep. 29, 2022

Related U.S. Application Data

(63) Continuation of application No. 16/360,286, filed on Mar. 21, 2019, now Pat. No. 11,360,859.

(60) Provisional application No. 62/657,614, filed on Apr. 13, 2018.

(51) Int. Cl.
| | |
|---|---|
| *G06F 16/907* | (2019.01) |
| *G06F 9/50* | (2006.01) |
| *G06F 11/14* | (2006.01) |
| *G06F 16/14* | (2019.01) |
| *G06F 16/18* | (2019.01) |
| *G06F 16/182* | (2019.01) |
| *G06F 16/188* | (2019.01) |
| *G06F 21/62* | (2013.01) |

(52) U.S. Cl.
CPC ........ *G06F 11/1469* (2013.01); *G06F 9/5077* (2013.01); *G06F 11/1464* (2013.01); *G06F 16/148* (2019.01); *G06F 16/182* (2019.01); *G06F 16/1844* (2019.01); *G06F 16/1873* (2019.01); *G06F 16/188* (2019.01); *G06F 16/907* (2019.01); *G06F 21/6218* (2013.01); *G06F 2201/84* (2013.01)

(58) Field of Classification Search
CPC ............. G06F 11/1469; G06F 11/1464; G06F 16/907; G06F 16/182; G06F 16/1844; G06F 16/1873; G06F 16/188; G06F 16/148
USPC ........................................................ 707/695
See application file for complete search history.

(56) References Cited

U.S. PATENT DOCUMENTS

| | | | |
|---|---|---|---|
| 9,462,055 B1 * | 10/2016 | Herrin | G06F 16/1844 |
| 10,057,246 B1 | 8/2018 | Drozd et al. | |
| 11,640,461 B2 * | 5/2023 | Mitra | G06F 21/53 |
| | | | 718/1 |
| 2010/0332401 A1 * | 12/2010 | Prahlad | G06F 16/1844 |
| | | | 711/E12.001 |
| 2012/0042162 A1 | 2/2012 | Anglin et al. | |
| 2013/0110778 A1 * | 5/2013 | Taylor | G06F 11/1435 |
| | | | 707/624 |

(Continued)

*Primary Examiner* — Joshua Bullock
(74) *Attorney, Agent, or Firm* — Holland & Hart LLP

(57) ABSTRACT

The technology disclosed herein enables the restoration of a database version across cloud environments. In a particular embodiment, a method provides receiving, in a second cloud environment from a first cloud environment, first metadata describing a first data version stored in the first cloud environment. The first data version includes first data items and the first metadata. After receiving the first metadata, the method provides receiving, in the second cloud environment, an instruction to restore the first data items to the second cloud environment. In response to the instruction, the method provides restoring the first data items to the second cloud environment using the first metadata.

20 Claims, 7 Drawing Sheets

(56) References Cited

U.S. PATENT DOCUMENTS

| | | | |
|---|---|---|---|
| 2013/0110779 A1* | 5/2013 | Taylor | G06F 16/1844 |
| | | | 707/624 |
| 2013/0117240 A1* | 5/2013 | Taylor | G06F 16/182 |
| | | | 707/690 |
| 2014/0006357 A1* | 1/2014 | Davis | G06F 3/067 |
| | | | 707/667 |
| 2014/0059226 A1 | 2/2014 | Messerli et al. | |
| 2014/0279915 A1* | 9/2014 | Gadish | G06F 11/1482 |
| | | | 707/641 |
| 2015/0012495 A1 | 1/2015 | Prahlad et al. | |
| 2015/0113531 A1* | 4/2015 | Lv | G06F 9/4856 |
| | | | 718/1 |
| 2016/0246981 A1* | 8/2016 | Nakagawa | G06F 21/6254 |
| 2016/0321291 A1 | 11/2016 | Malhotra et al. | |
| 2017/0262347 A1 | 9/2017 | Dornemann | |
| 2019/0278662 A1 | 9/2019 | Nagrale et al. | |
| 2019/0317866 A1 | 10/2019 | Zhou et al. | |
| 2019/0317926 A1 | 10/2019 | Zhou et al. | |
| 2019/0317962 A1 | 10/2019 | Zhou et al. | |

\* cited by examiner

US 11,928,037 B2

DATABASE RESTORATION ACROSS CLOUD ENVIRONMENTS

CROSS REFERENCE TO RELATED APPLICATIONS

This application is a continuation of U.S. patent application Ser. No. 16/360,286 by Zhou et al., entitled "Database Restoration Across Cloud Environments", filed Mar. 21, 2019; which claims the benefit of priority to U.S. Provisional Application No. 62/657,614, filed Apr. 13, 2018; each of which is hereby incorporated by reference in its entirety.

In addition, this application is related to U.S. patent application Ser. No. 16/360,307 by Zhou et al., entitled "Database Restoration Across Cloud Environments", filed Mar. 21, 2019; and U.S. patent application Ser. No. 16/360,339 by Zhou et al., entitled "Database Restoration Across Cloud Environments", filed Mar. 21, 2019. Both U.S. patent application Ser. Nos. 16/360,307 and 16/360,339 claim the benefit of priority to U.S. Provisional Application No. 62/657,614, filed Apr. 13, 2018.

TECHNICAL BACKGROUND

The use of cloud providers is becoming more prevalent. Entities from businesses to individuals typically pay cloud providers for the use of the providers' computing resources, such as computer processing, networking, and data storage resources. Using one or more cloud providers allows an entity to reduce or remove the need for the entity to acquire and maintain the resources that are otherwise provided by the cloud provider. For example, an entity with a network-based application may choose to host that application in a cloud provider rather than on the entity's own application servers. Additionally, cloud providers may allow an entity to easily scale their computing resources by providing computing resources on demand.

Likewise, many entities are now storing and managing databases in cloud providers. The current production version of a database and versions of the database captured over time may be stored in a cloud provider. As such, if a previous version of the database is to be restored, the restoration will need to occur in the same cloud provider.

OVERVIEW

The technology disclosed herein enables the restoration of a database version across cloud environments. In a particular embodiment, a method provides receiving, in a second cloud environment from a first cloud environment, first metadata describing a first data version stored in the first cloud environment. The first data version includes first data items and the first metadata. After receiving the first metadata, the method provides receiving, in the second cloud environment, an instruction to restore the first data items to the second cloud environment. In response to the instruction, the method provides restoring the first data items to the second cloud environment using the first metadata.

In some embodiments, restoring the first data items comprises, in the second cloud environment, obtaining the first data items from the first cloud environment and populating a database in the second cloud environment with the first data items.

In some embodiments, the method provides, in the first cloud environment, creating the first data version. In those embodiments, creating the first data version may comprise capturing a snapshot of the first data items from a database maintained in the first cloud environment.

In some embodiments, the first metadata indicates to the second cloud environment that the first data version is stored in the first cloud environment.

In some embodiments, the method provides, in the second cloud environment, creating a second data version including second data items and second metadata describing the second data version and storing the second data version in the second cloud environment. In those embodiments, the method may further provide transferring the second metadata to the first cloud environment. Also, in those embodiments, the method may provide, in the second cloud environment, receiving a request for the second data items from the first cloud environment, wherein the first cloud environment transfers the request to the second cloud environment in response to a second instruction to restore the second data items to the first cloud environment. The method may also provide transferring the second metadata to a third cloud environment.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to receive first metadata describing a first data version stored in the first cloud environment. The first data version includes first data items and the first metadata. After receiving the first metadata, the program instructions direct the processing system to receive an instruction to restore the first data items to the second cloud environment and, in response to the instruction, restore the first data items to the second cloud environment using the first metadata.

In yet another embodiment, one or more computer readable storage media are provided. The one or more computer readable storage media having program instructions stored thereon that, when executed by a processing system in a second cloud environment, direct the processing system to receive first metadata describing a first data version stored in the first cloud environment. The first data version includes first data items and the first metadata. After receiving the first metadata, the program instructions direct the processing system to receive an instruction to restore the first data items to the second cloud environment and, in response to the instruction, restore the first data items to the second cloud environment using the first metadata.

DETAILED DESCRIPTION

The technology described below allows for the restoration of a database version located in one cloud environment to another cloud environment. In particular, when a data version that is created in one cloud environment, metadata for the data version is also created. Should the data version ever be restored, the system performing that restoration will use the metadata to identify the data associated with the data version and repopulate a database with that data. The metadata is shared across cloud environments so that the metadata can be used to restore the data version in any one of the cloud environments having the metadata stored therein. Even if only one of the cloud environments having the metadata also stores the data for the data version, the data can be obtained from the cloud environment where it is stored based on the metadata.

Figure 1:
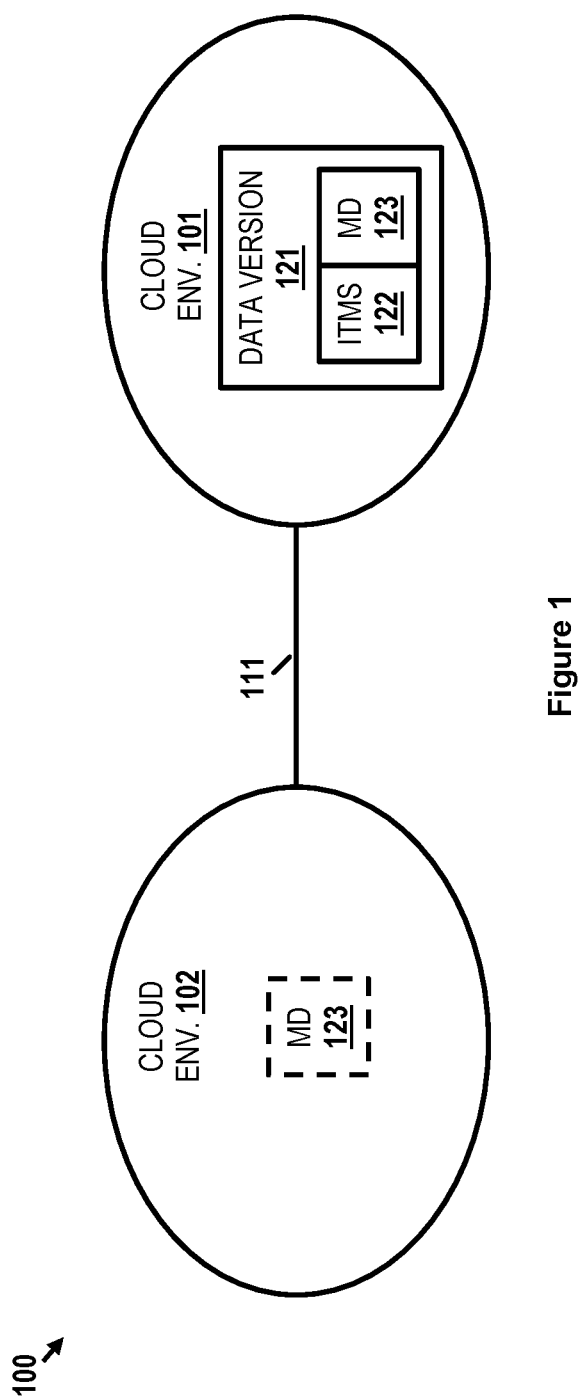
FIG. 1 illustrates an implementation for restoring a database across cloud environments.

FIG. 1 illustrates implementation 100 for restoring a database across cloud environments. Implementation 100 includes cloud environment 101 and cloud environment 102. Cloud environment 101 and cloud environment 102 communicate over communication link 111. Communication link 111 may include one or more wired or wireless communication links and may include any number of intervening networks, systems, and devices. Cloud environment 101 and cloud environment 102 include data processing, networking, and storage resources that are provided to entities external to the environments. Commonly, since cloud environments are accessed remotely over communication networks, a cloud environment may include a number of rack mounted computing servers and network attached storage devices, although other types of computing systems and storage devices may be used. It should be understood that the storage systems and devices described herein should not be interpreted to be a mere propagated signal. In many cases, a cloud environment may be distributed across multiple geographic locations. It should be understood that, when a cloud environment is described as performing an action herein, it is the resources within the cloud environment that perform the action. Likewise, in some examples, a system causing data (e.g., the data items, data versions, metadata, etc. described herein) to be stored in a cloud environment, such as a versioning system described below, may be located outside of the cloud environment and uses the data storage resources within the cloud environment to store the data.

In operation, data version 121 is created in cloud environment 101. Data version 121 may be created as a snapshot of a database also being stored and managed within cloud environment 101. In this example, data version 121 comprises an incremental data version, which only stores data items that have changed since a previous data version was created, although may comprise another type of data version in other examples. While any one incremental data version only stores the data items that have changed since a previous data version was created, each data version is said to include all data items in a database at the time of the data version's creation. The data version simply refers to previous data versions where the rest of the data items are stored. As such, data items 122 represent the entirety of the data items in the database represented by data version 121 and not just those data items that have changed since the data version immediately preceding data version 121 was created. Metadata 123 is also created as part of data version 121. Metadata 123 identifies data items 122 and, more importantly, identifies where data items 122 are located. In this example, data items 122 are located within cloud environment 101. After data version 121 is created, cloud environment 101 shares metadata 123 with cloud environment 102. Metadata 123 may be shared with additional cloud environments in other examples. Cloud environment 102 can then use metadata 123 to restore a database to the state represented by data version 121 using metadata 123 should cloud environment 102 ever be instructed to do so. While metadata 123 is shown within data version 121 along with data items 122, data items 122 and metadata 123 may be stored in separate locations within cloud environment 101.

Figure 2:
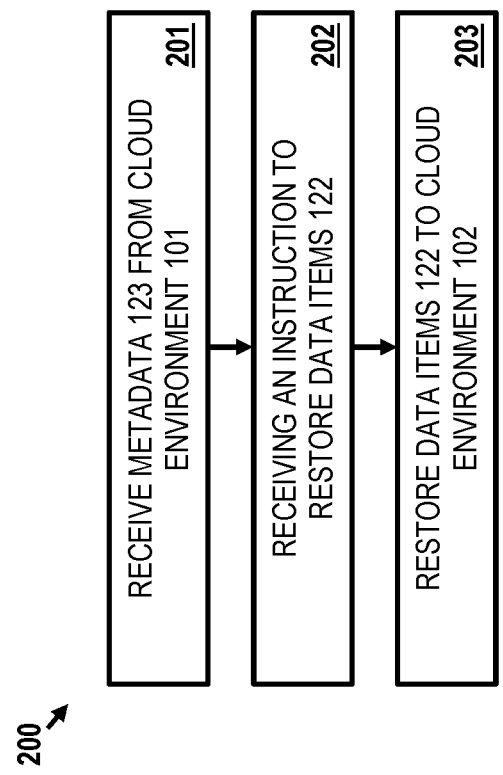
FIG. 2 illustrates a scenario for the implementation to restore a database across cloud environments.

FIG. 2 illustrates scenario 200 for implementation 100 to restore a database across cloud environments. In scenario 200, cloud environment 102 receives metadata 123 describing data version 121 (operation 201). Metadata 123 at least describes where data items 122 are located within cloud environment 101 such that a cloud environment outside of cloud environment 101 can access data items 122. Likewise, metadata 123 may need to indicate an access procedure or protocol(s) required by cloud environment 101 for accessing data stored therein. In some cases, metadata 123 may further include authorization information (e.g., passcode, authentication token, etc.) necessary to confirm to cloud environment 101 that cloud environment 102 is authorized to access data items 122. In other examples, cloud environment 102, or cloud environment 101 upon receiving a request for data items 122, may request authorization information from a user when attempting to access data items 122. Metadata 123 may further indicate a time associated with data version 121 (e.g., when data version 121 was created, when a database snapshot was captured from which data version 121 was created, or some other time that would be indicative of a time in which the database existed in the state captured by data version 121). Likewise, metadata 123 may indicate one or more previous data versions (or metadata of those data versions) from which data items of data items 122 are located when not copied due to the incremental nature of data version 121.

After receiving metadata 123, cloud environment 102 receives an instruction to restore data items 122 to cloud environment 102 (operation 202). The instruction may come from a user after cloud environment 102 presents the user with information indicating all data versions, including data version 121, available for restoration into cloud environment 102. For example, the user may operate a workstation or other computing device that communicates with cloud environment 102 to provide the user with access to cloud environment 102's capabilities. Cloud environment 102 may provide the user with an indication of the data versions for which cloud environment 102 has metadata stored (e.g., may show data versions in association with the time indicated by the metadata so that the user can select a data version associated with the user's desired time).

Regardless of how/why the instruction is received by cloud environment 102, in response to the instruction, cloud environment 102 restores data items 122 to cloud environment 102 using metadata 123 (operation 203). In particular, as noted above, the metadata 123 indicates where data items 122 are located within cloud environment 101 and, if necessary, indicates what access procedures, protocol(s), authorization information are required by cloud environment 101 for cloud environment 102 to access data items 122 therein. Cloud environment 102 therefore acts in accordance with metadata 123 to obtain data items 122 from cloud environment 101 and restore data items 122 to a database within cloud environment 102. After restoration, cloud environment 102 can perform any database functions that cloud environment 102 would be able to perform on database that was restored from data items in a data version stored within cloud environment 102.

Figure 3:
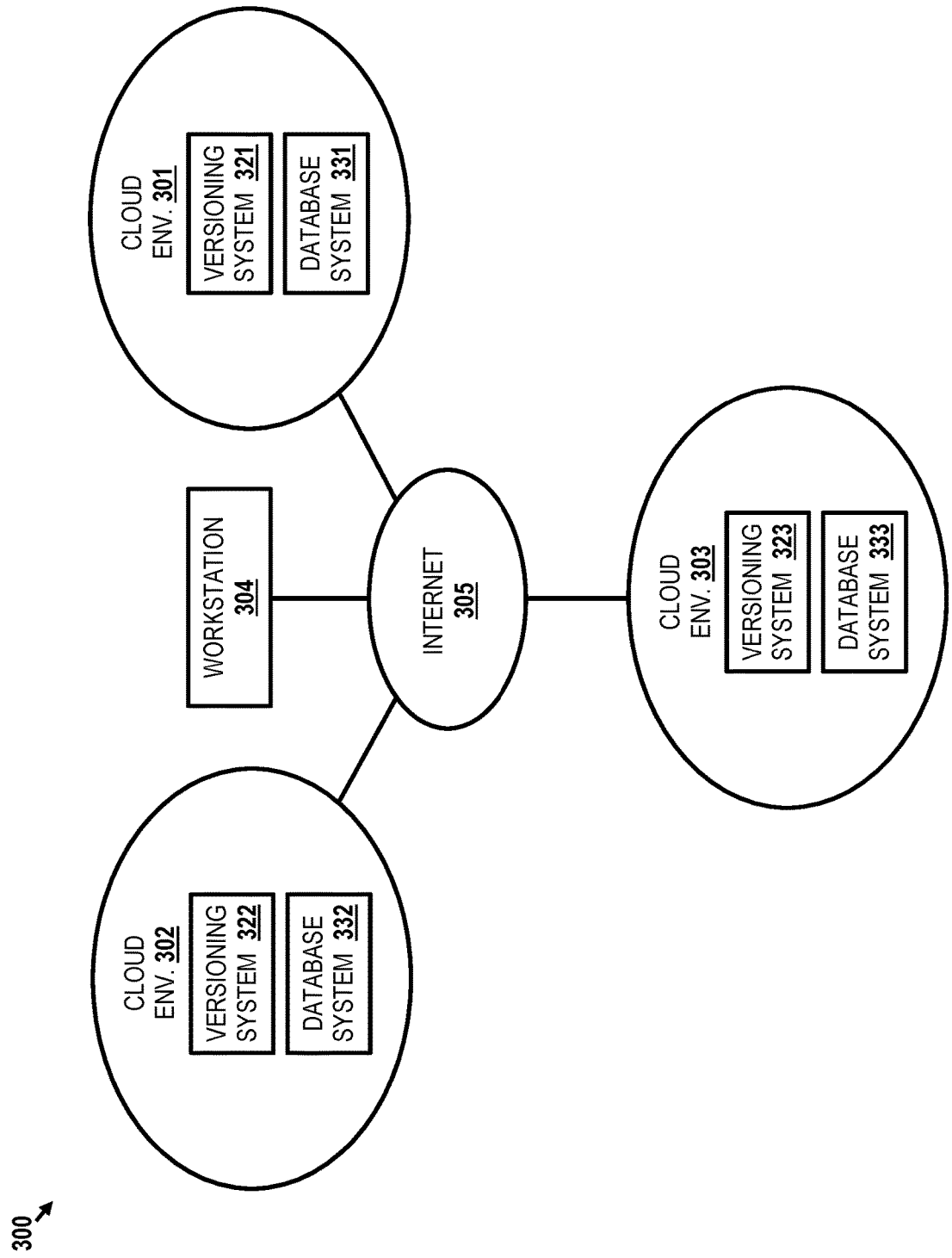
FIG. 3 illustrates another implementation for restoring a database across cloud environments.

FIG. 3 illustrates implementation 300 for restoring a database across cloud environments. Implementation 300 includes cloud environment 301, cloud environment 302, cloud environment 303, workstation 304, and Internet 305. Cloud environment 301 includes versioning system 321 and versioning system 322. Cloud environment 302 includes versioning system 322 and database system 332. Cloud environment 303 includes versioning system 323 and database system 333.

In operation, workstation 304 communicates with each of cloud environment 301, cloud environment 302, and cloud environment 303 over Internet 305. Specifically, workstation 304 communicates with database system 331, database system 332, and database system 333 to access and/or manage databases maintained by database system 331, database system 332, and database system 333 within cloud environment 301, cloud environment 302, and cloud environment 303, respectively. Workstation 304 further communicates with versioning system 321, versioning system 322, and versioning system 323 which may allow a user to manage aspects of the versioning and, if necessary, the recovery of those databases.

Figure 4:
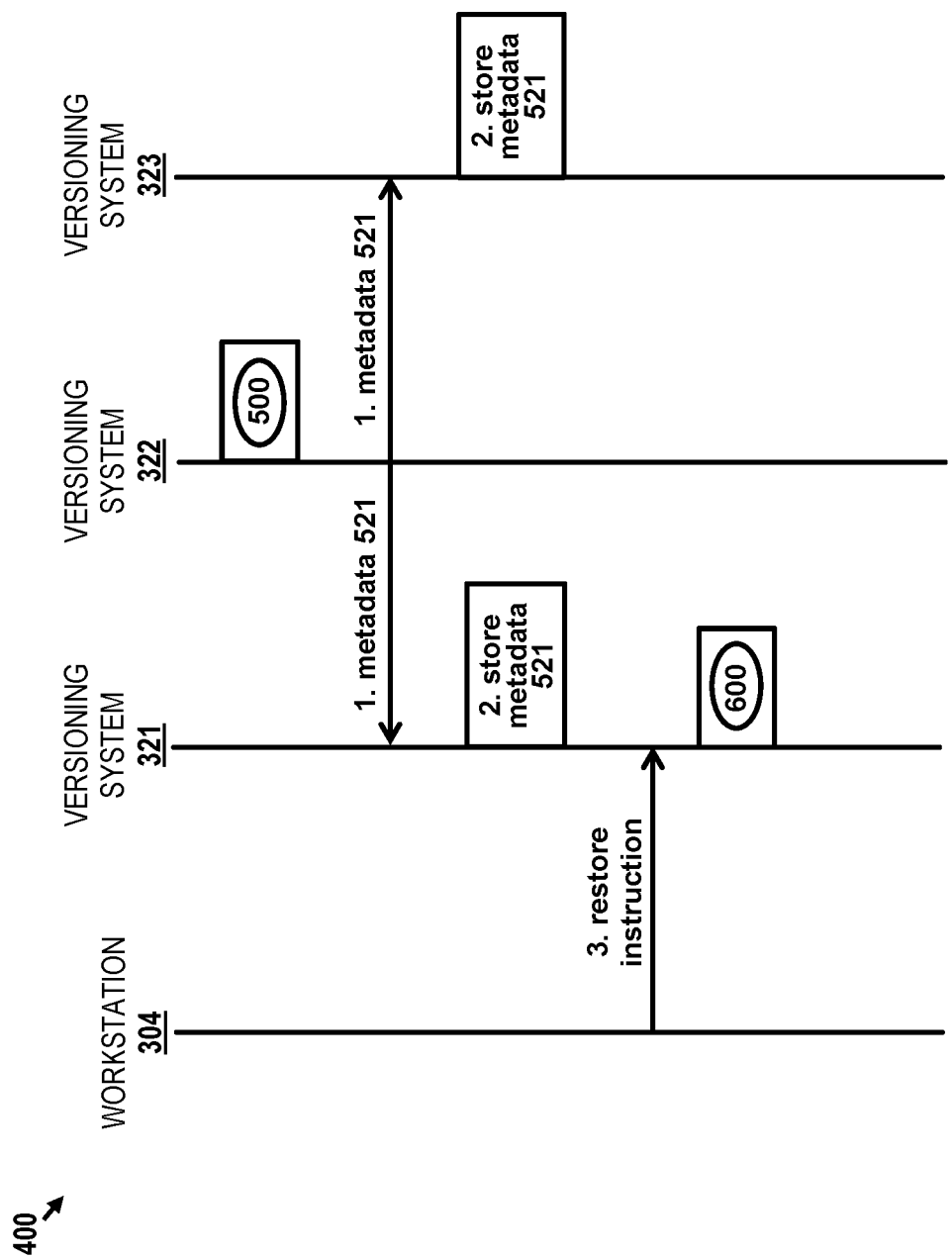
FIG. 4 illustrates a scenario for the other implementation to restore a database across cloud environments.

FIG. 4 illustrates scenario 400 for implementation 300 to restore a database across cloud environments. Scenario 400 focuses on metadata being shared for data versions created by versioning system 322 of a database maintained by database system 332. Although, versioning system 321 and/or versioning system 323 may perform similarly with database system 331 and database system 333, respectively. Similarly, while scenario 400 focuses on versioning system 321 restoring from a database version, versioning system 322 and/or versioning system 323 may preform database restoration in a similar manner using metadata received from another versioning system. Scenario 400 begins with versioning system 322 performing in accordance with scenario 500, as described below.

Figure 5:
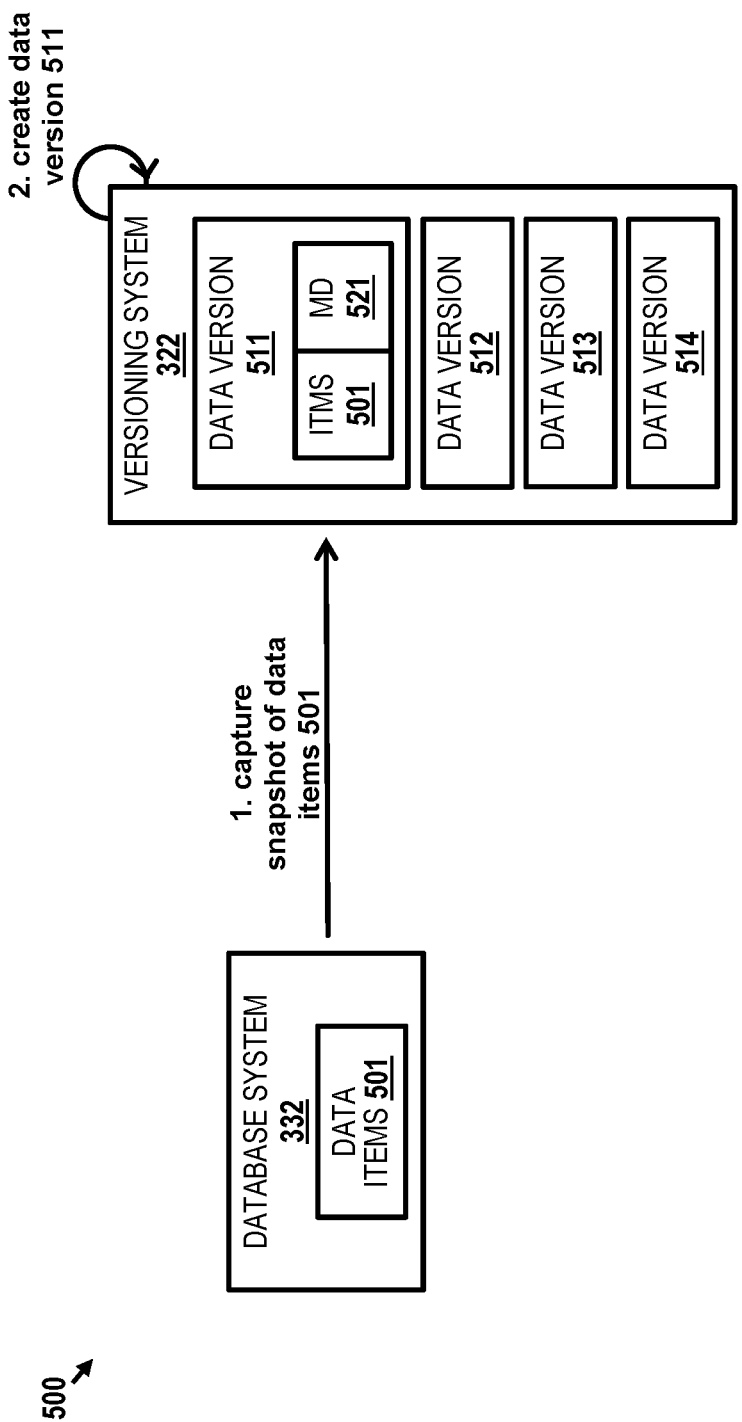
FIG. 5 illustrates another scenario for the other implementation to restore a database across cloud environments.

FIG. 5 illustrates scenario 500 for implementation 300 to restore a database across cloud environments. Scenario 500 describes an example for how a single database version may be created. In this example, versioning system 322 is configured to periodically (e.g., once per day at a specified time) create a data version of a database maintained by database system 332. Other examples may create data versions on different schedules or upon occurrence of different trigger events. When the time comes for creation of a data version, versioning system 322 captures a snapshot at step 1 of data items 501 that comprise the database maintained by database system 332. The snapshot is used to create data version 511 representing the state of data items 501 at the time the snapshot was captured.

Versioning system 322 already includes data version 512, data version 513, and data version 514 at the time data version 511 is created. Data version 511, data version 512, data version 513, and data version 514 are incremental data versions that each store the changes to data items 501 since the previous data version was created. Data version 514 is the oldest data version and, therefore, stored the entirety of data items 501. Data version 513 then represents the changes since data version 514 was created, data version 512 represents the changes since data version 513 was created, and data version 511 represents the changes since data version 512 was created. Thus, while data items 501 within data version 511 represent the entirety of data version 511 at the time the snapshot was captured, some of the actual data items may be stored in association with the previously created data versions 512-514. Also, while not shown, each of data version 512, data version 513, and data version 514 include metadata having information about each respective data version similar to metadata 521 created for data version 511.

Metadata 521 includes information necessary for any of versioning system 321, versioning system 322, and versioning system 323 to access data items 501 for data version 511 to restore to database system 331, database system 332, and database system 333 respectively. Metadata 521 may include a version identifier that identifies data version 511 from other data versions created by versioning system 322. In some cases, metadata 521 may include a specific storage location for data items 501 within cloud environment 302 (e.g., an address within a storage system to which versioning system 322 stored data items 501). In this example, metadata 521 may indicate the location (e.g., address) of versioning system 322 so that versioning system 321 or versioning system 323 can query versioning system 322 for data items 501. Other information that may be useful for versioning system 321 or versioning system 323 to access data items 501 within cloud environment 302.

Referring back to scenario 400, once metadata 521 has been created in accordance with scenario 500, versioning system 322 shares metadata 521 with versioning system 321 and versioning system 323 by transferring metadata 521 at step 1 to each of versioning system 321 and versioning system 323. Upon receiving metadata 521, versioning system 321 and versioning system 323 both store metadata 521 at step 2. The metadata may be stored within versioning system 321 and versioning system 323 or versioning system 321 and versioning system 323 may store metadata 521 in storage systems elsewhere in cloud environment 301 and cloud environment 302, respectively. Though not shown, versioning system 321 and versioning system 323 may have previously received metadata for data version 512, data version 513, and data version 514 during earlier iterations of steps 1 and 2 when data version 512, data version 513, and data version 514 were created by versioning system 322. Likewise, while not shown, versioning system 322 may continue to create data versions of data items 501 subsequent to data version 511 on the periodic basis described in scenario 500. The metadata associated with each of those versions may also be shared with versioning system 321 and versioning system 323.

At a point in time after versioning system 321 has received and stored metadata 521, versioning system 321 receives an instruction from workstation 304 at step 3 that instructs versioning system 321 to restore a database with the state of data items 501 represented by data version 511. Workstation 304 may transfer the instruction to versioning system 321 based on input received from a user of workstation 304 indicating the user's desire for the restoration. In some examples, workstation 304 may obtain information about the data versions available for restoration from versioning system 321. For example, versioning system 321 may provide information about data version 511, data version 512, data version 513, and data version 514 to workstation 304 (e.g., indicates a day/time when each version was created), which presents that information to the user. The user then selects data version 511 based on that information. In alternative examples, the user may provide workstation 304 with a day/time to which the user wants a database to be restored. Workstation 304 may provide that time to versioning system 321 with the instruction at step 3 and versioning system 321 uses that time to find the data version that best satisfies the request. Regardless of how data version 511 is identified for restoration, versioning system 321 performs in accordance with scenario 600 to restore a database to the state of data items 501 represented by data version 511.

Figure 6:
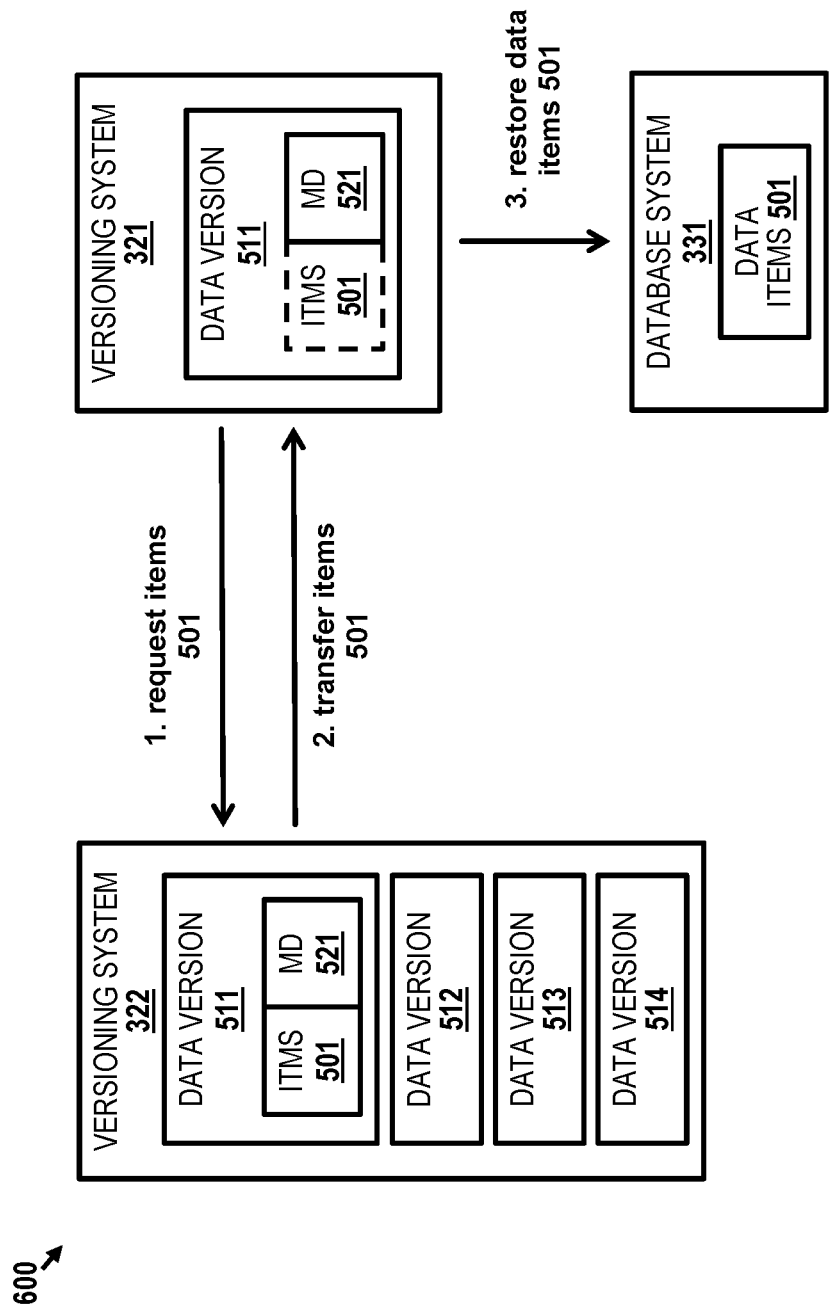
FIG. 6 illustrates a further scenario for the other implementation to restore a database across cloud environments.

FIG. 6 illustrates scenario 600 for implementation 300 to restore a database across cloud environments. In scenario 600, data version 511 is represented within versioning system 321 by metadata 521 received from versioning system 322, although metadata 521 may be stored elsewhere in cloud environment 301. Storing only the metadata until data items are needed for database restoration, or otherwise, consumes a minimal amount of storage space relative to storing a duplicate of the data items already stored in cloud environment 302. Since data items 501 as represented by data version 511 are not already stored within cloud environment 301, versioning system 321 requests data items 501 from versioning system 322 at step 1 because versioning system 322 is where metadata 521 directs versioning system 321 to obtain data items 501. In response to the request from versioning system 321, versioning system 322 locates data items 501 represented by data version 511 and transfers data items 501 at step 2 to versioning system 321. As noted above, data items 501 may be stored locally within versioning system 322 or versioning system 322 may store data items 501 on a storage system elsewhere within cloud environment 302.

Upon receiving data items 501, versioning system 321 populates a database in database system 331 with data items 501 at step 3. Once populated, workstation 304 or any other system with access to database system 331 may operate on data items 501 in database system 331 like those systems would with a database restored from data items originally stored within cloud environment 301 by versioning system 321.

Figure 7:
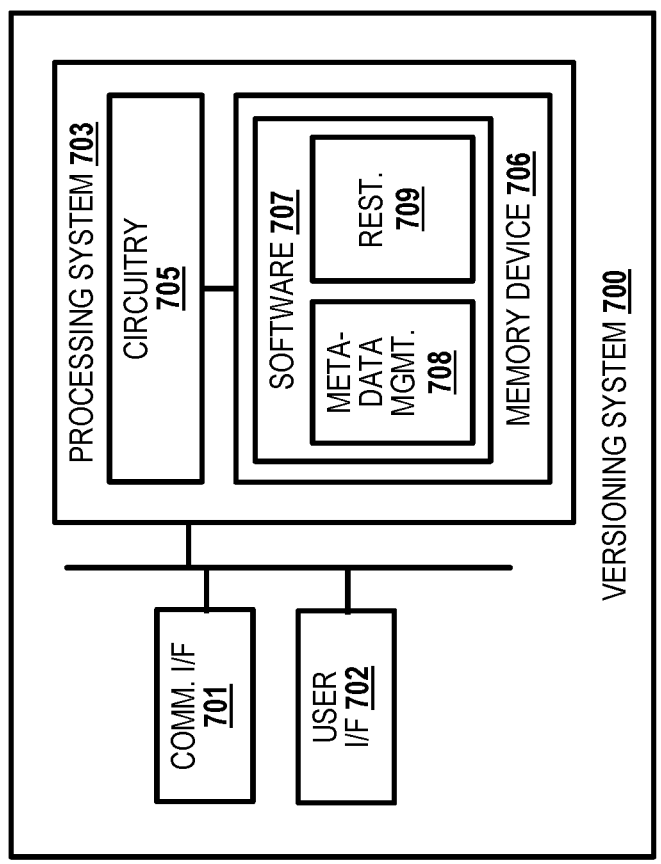
FIG. 7 illustrates a computing architecture for restoring a database across cloud environments.

FIG. 7 illustrates versioning system 700 for restoring a database across cloud environments. Versioning system 700 is an example computing architecture for versioning system 321, versioning system 322, and versioning system 323 along with computing resources within cloud environment 101 and cloud environment 102, although alternative configurations may also be used. Versioning system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises processing circuitry, such as a microprocessor, and other circuitry that retrieves and executes operating software 707 from memory device 706. Memory device 706 comprises a computer readable storage medium, such as a disk drive, flash drive, data storage circuitry, or some other memory apparatus and in no cases should be considered a mere propagated signal. Operating software 707 comprises computer programs, firmware, or some other form of machine-readable processing instructions. Operating software 707 includes metadata management module 708 and database restoration module 709. Operating software 707 may further include an operating system, utilities, drivers, network interfaces, applications, or some other type of software. When executed by circuitry 705, operating software 707 directs processing system 703 to operate versioning system 700 as described herein.

In particular, metadata management module 708 directs processing system 703 to receive first metadata describing a first data version stored in the first cloud environment. The first data version includes first data items and the first metadata. After receiving the first metadata, database restoration module 709 directs processing system 703 to receive an instruction to restore the first data items to the second cloud environment and, in response to the instruction, restore the first data items to the second cloud environment using the first metadata.

The descriptions and figures included herein depict specific implementations of the claimed subject matter. Some variations from these implementations may be appreciated that fall within the scope of the claimed subject matter. It may also be appreciated that the features described above can be combined in various ways to form multiple implementations. As a result, the claimed subject matter is not limited to the specific implementations described herein, but only by the claims and their equivalents.

What is claimed is:

1. A method at a first cloud environment, comprising:
transmitting, from the first cloud environment to a second cloud environment, metadata for a data version stored in the first cloud environment, wherein the data version includes data items and the metadata, and wherein the metadata indicates authorization information associated with accessing the data items at the first cloud environment;
receiving, at the first cloud environment after transmitting the metadata, a request from the second cloud environment for the data items included in the data version, the request comprising the authorization information; and
transmitting, from the first cloud environment to the second cloud environment, the data items in response to the request based at least in part on the request comprising the authorization information.

2. The method of claim 1, further comprising:
capturing, before transmitting the metadata, a snapshot of the data items from a database maintained in the first cloud environment; and
creating the data version including the data items and the metadata using the snapshot.

3. The method of claim 2, wherein the metadata is transmitted to the second cloud environment in response to the creation of the data version.

4. The method of claim 1, wherein the metadata indicates a location of the data items in the first cloud environment, an access procedure associated with the data items, a version identifier associated with the data version, an identifier associated with the first cloud environment, or any combination thereof.

5. The method of claim 1, wherein the request further comprises a location of the data items in the first cloud environment, a version identifier associated with the data version, or any combination thereof.

6. The method of claim 1, wherein the request is in accordance with an access procedure indicated by the metadata, and wherein the data items are transmitted based at least in part on the request being in accordance with the access procedure.

7. The method of claim 1, further comprising:
authorizing transmission of the data items to the second cloud environment based at least in part on the authorization information included in the request.

8. The method of claim 1, wherein the metadata, the request, the data items, or any combination thereof, are communicated directly between the first cloud environment and the second cloud environment.

9. A method at a second cloud environment, comprising:
receiving, at the second cloud environment from a first cloud environment, metadata for a data version stored in the first cloud environment, wherein the data version includes data items and the metadata, and wherein the metadata indicates authorization information associated with accessing the data items at the first cloud environment;
transmitting, from the second cloud environment after receiving the metadata, a request to the first cloud environment for the data items included in the data version, the request comprising the authorization information; and
receiving, at the second cloud environment from the first cloud environment, the data items in response to the request based at least in part on the request comprising the authorization information.

10. The method of claim 9, further comprising:
receiving an instruction to restore the data items to the second cloud environment, wherein the request for the data items is transmitted in response to the instruction.

11. The method of claim 10, further comprising:
providing information associated with the data version to a user of the second cloud environment based at least in part on receiving the metadata, wherein the instruction is received from the user based at least in part on the information associated with the data version.

12. The method of claim 10, wherein the instruction indicates a time at which the data items are to be restored to the second cloud environment, and wherein the request for the data items is transmitted in accordance with the indicated time.

13. The method of claim 9, wherein the metadata indicates a location of the data items in the first cloud environment, an access procedure associated with the data items, a version identifier associated with the data version, an identifier associated with the first cloud environment, or any combination thereof.

14. The method of claim 9, wherein the request further comprises a location of the data items in the first cloud environment, a version identifier associated with the data version, or any combination thereof.

15. The method of claim 9, wherein the request is in accordance with an access procedure indicated by the metadata, and wherein the data items are received based at least in part on the request being in accordance with the access procedure.

16. The method of claim 9, wherein the metadata, the request, the data items, or any combination thereof, are communicated directly between the first cloud environment and the second cloud environment.

17. A system in a first cloud environment, comprising:
memory; and
one or more processors coupled with the memory and configured to cause the system to:
transmit, from the first cloud environment to a second cloud environment, metadata for a data version stored in the first cloud environment, wherein the data version includes data items and the metadata, and wherein the metadata indicates authorization information associated with accessing the data items at the first cloud environment;
receive, at the first cloud environment after transmitting the metadata, a request from the second cloud environment for the data items included in the data version, the request comprising the authorization information; and
transmit, from the first cloud environment to the second cloud environment, the data items in response to the request based at least in part on the request comprising the authorization information.

18. The system of claim 17, wherein the metadata indicates a location of the data items in the first cloud environment, an access procedure associated with the data items, a version identifier associated with the data version, an identifier associated with the first cloud environment, or any combination thereof.

19. A system in a second cloud environment, comprising:
memory; and
one or more processors coupled with the memory and configured to cause the second cloud environment to:
receive, at the second cloud environment from a first cloud environment, metadata for a data version stored in the first cloud environment, wherein the data version includes data items and the metadata, and wherein the metadata indicates authorization information associated with accessing the data items at the first cloud environment;
transmit, from the second cloud environment after receiving the metadata, a request to the first cloud environment for the data items included in the data version, the request comprising the authorization information; and
receive, at the second cloud environment from the first cloud environment, the data items in response to the request based at least in part on the request comprising the authorization information.

20. The system of claim 19, wherein the one or more processors are further configured to cause the second cloud environment to:
receive an instruction to restore the data items to the second cloud environment, wherein the request for the data items is transmitted in response to the instruction.

* * * * *